Nov. 13, 1962  J. H. GREGOWSKI ETAL  3,063,422
ELECTROMECHANICAL DEVICE
Filed June 13, 1960

INVENTORS
JOEL GREGOWSKI
GLENN A. WALTERS
AGENT

United States Patent Office 3,063,422
Patented Nov. 13, 1962

3,063,422
ELECTROMECHANICAL DEVICE
Joel H. Gregowski, Mountain View, and Glenn A. Walters, Atherton, Calif., assignors, by mesne assignments, to the United States of America as represented by the Secretary of the Navy
Filed June 13, 1960, Ser. No. 35,853
4 Claims. (Cl. 121—38)

The present invention relates to electromechanical servo devices and more particularly to a magnetically inert electromechanical actuator for a gimbal stabilized magnetometer detecting head.

Magnetic detecting systems using saturable core magnetometers as detectors have been adapted for use by low-flying aircraft to locate submerged submarines and other similar objects by measuring ambient magnetic anomalies or irregular deviations caused by the presence of the submarine in the same magnetic field of the earth as the detector. Small angular displacements of the detecting element from this field will produce signals undistinguishable from anomalous signals caused by a submarine. To properly evaluate these anomalies, it is therefore necessary to stabilize the magnetometer detecting element in a given direction or orientation with respect to the magnetic field of the earth. Stabilization is accomplished through appropriate servo actuators and gimbals which maintain a given orientation of the detecting element irrespective of the aircraft motions of roll, yaw, or pitch. These motions are often severe and rapid, hence a fundamental requirement, in addition to the necessity that the servo actuators and gimbals be constructed of substantially nonmagnetic materials, is that the actuators have relatively high frequency response and position repeatability characteristics whereby the detecting head is maintained stabilized.

A general purpose of this invention is to provide an electromechanical actuator which can be used for positioning the gimbals supporting a magnetometer detecting head without degrading measurement of the ambient magnetic field anomalies caused by a submarine. To achieve this purpose, the present invention employs a magnetically inert electrostrictive bilaminar or Bimorph [1] ceramic strip actuated valve in combination with a fluid-operated rotary-vane motor for positioning the gimbals in accordance with an electrical signal applied to the strips indicative of the angular displacement of the detecting head from the prescribed orientation with respect to the magnetic field of the earth. The valve and motor are arranged so that the connections therebetween obtain a minimal fluid compliance.

Accordingly, it is an object of the present invention to provide a magnetically inert electromechanical actuator for a gimbal-stabilized magnetometer detecting head.

Another object of the invention is the provision of a fluid motor and valve combination having high frequency response characteristics together with discrete and precise motor positioning for all angular displacements.

A further object is to provide an electrostrictive bilaminar ceramic strip for actuating a cantilever flapper-type valve element for controlling fluid flow from a nozzle.

Still another object of the invention is the provision of a fluid motor and valve combination which is extremely small, compact and relatively simple to construct.

Yet another object of the invention is to provide a rotary-vane fluid motor having very close tolerances and still maintaining a minimum coefficient of friction between the moving parts.

A still further object of the invention is to provide an integrally arranged valve and fluid motor combination wherein the length of fluid connections therebetween are negligible.

These and other objects and many of the attendant advantages of the present invention will be readily appreciated as the same become better understood by reference to the following detailed description when considered in connection with the accompanying drawings wherein.

Figure 1:
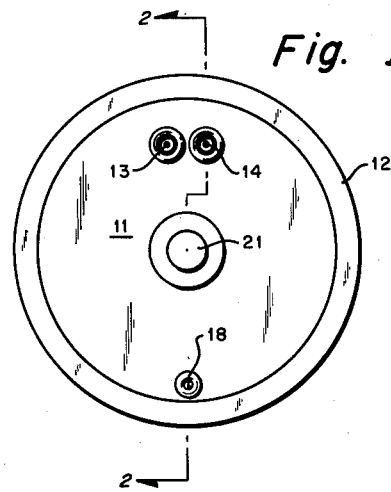
FIG. 1 represents an end view of a preferred embodiment of an electromechanical actuator of the present invention.
Figure 2:
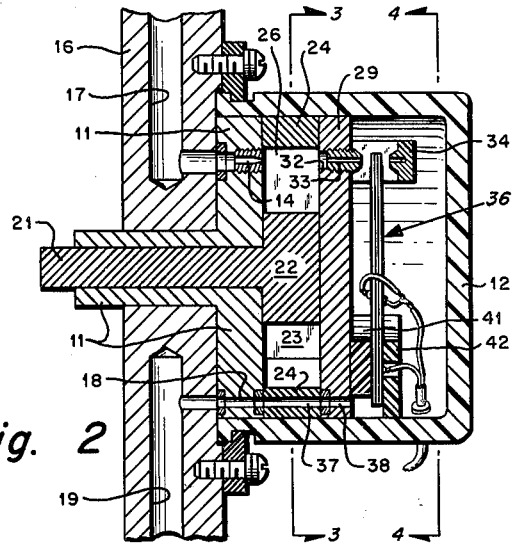
FIG. 2 represents a sectional view of the actuator taken substantially on the line 2—2 as shown in FIG. 1 and further illustrates the actuator mounted on a fragmentary cross-section of a gimbal.

Referring now to the drawings, wherein like reference characters designate like or corresponding parts throughout the several views, there is illustrated in FIG. 1 a preferred embodiment of an electro-mechanical actuator as viewed toward the shaft end thereof. Taken with the cross-sectional elevation view shown in FIG. 2, it is seen that the actuator comprises an end bearing plate 11 sealingly seated at the open end of cylindrical enclosure cup 12. A pair of inlet orifices 13 and 14 contained in the end bearing plate 11 permits the flow of a high pressure servo fluid therethrough. The actuator is fixed to one end of an outer gimbal 16 by suitable means whereby the axis of rotation of an inner gimbal, not shown, coincides with the axis of rotation of an output shaft 21 of the actuator.

Figure 3:
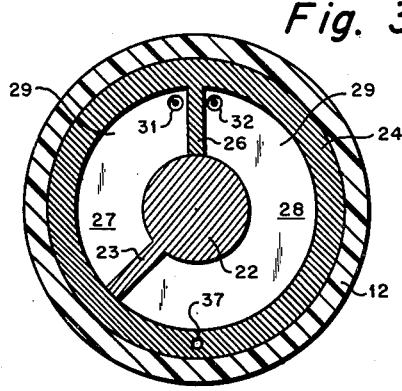
FIG. 3 represents a sectional view of the actuator taken substantially on the line 3—3 as shown in FIG. 2.

A high pressure fluid supply duct 17 in the gimbal 16 communicates through suitable seals with the inlet orifices 13 and 14; while an outlet orifice 18, substantially diametrically opposite of the inlet orifices 13 and 14, communicates through a suitable seal with a low pressure fluid drain duct 19 also in the gimbal 16. The output power shaft 21 extends into the cup 12 through the end bearing plate 11 and terminates in a shoulder 22 having a vane 23 extending radially outward therefrom. A spacer ring 24, best shown in FIG. 2 taken with FIG. 3, is fixed to the enclosure cup 12 adjacent to the end bearing plate 11 and includes a separating wall 24 of equal width directed radially inward and disposed between the inlet orifices 13 and 14. The shoulder 22, ring 24 and separating wall 26 are urged against the end bearing plate 11 by a cover plate 29 secured to end bearing plate 11 by suitable fastening means. Vane 23 extends outwardly from shoulder 22 until it slidingly engages the inner circular wall of the spacer ring 24; and separating wall 26 extends inwardly until it slidingly engages shoulder 22. Two expansible chambers 27 and 28 are formed thereby having the inlet orifices 13 and 14 respectively communicating high pressure fluid from duct 17 thereto.

A pair of bleed orifices 31 and 32 in the cover plate 29 are disposed substantially opposite of inlet orifices 13 and 14, respectively, and maintain fluid communication through the cover plate 29. Fluid flow from bleed orifices 31 and 32 are directed toward each other by nozzles 34 and 33, respectively, and are interposed by the free end of a cantilever flapper-type valve element indicated generally by the numeral 36. The fluid is drained from within the space defined by the cup 12 and cover plate 29 through holes 37 and 38 to the outlet orifice 18 and then through the drain duct 19. The relative positions

Figure 4:
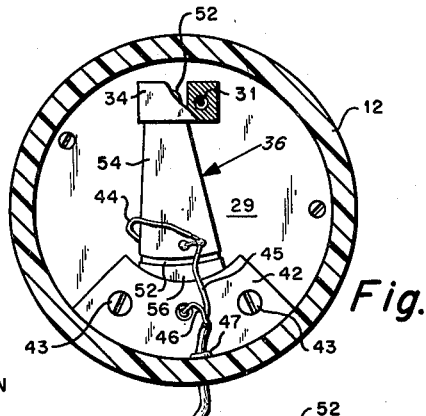
FIG. 4 represents a sectional view of the actuator taken substantially on the line 4—4 as shown in FIG. 2.

[1] A trademark registered in the U.S. Patent Office.

of the above-described bleed orifices 31 and 32 and nozzles 33 and 34 are shown in FIGS. 3 and 4.

The cantilever valve element 36 is supported at the fixed end between two electrically nonconducting mounting plates 41 and 42 which are in turn secured to the cover plate 29 by screws 43. An electrical supply, not shown, for exciting the element 36, is connected by wires 44, 45, and 46 which pass through a suitably sealed outlet 47 in the enclosure cup 12.

Figure 5:
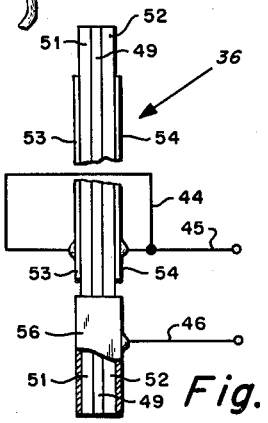
FIG. 5 represents an enlarged, partly cut-away, view of a preferred embodiment of the valve element employed in the actuator as shown in FIGS. 1 and 4.

The structure of the valve element 36 is best shown in more detail in FIG. 5. The valve element 36 includes an electrically conductive center support member 49 having substantially magnetically inert, electrostrictive ceramic flat strips 51 and 52 intimately secured to both of the flat sides and for the entire length of the main support member 49. The center support member 49 is preferably constructed of a resilient metallic strip which provides ample deflection at the free end but which retains sufficient stiffness to prevent undesirable oscillation. The strips 51 and 52 are preferably constructed of barium titanate or another ceramic having similar or better deflection versus applied voltage characteristics. Conductive coatings 53 and 54, contiguous to the outer surface of each of the strips 51 and 52, are commonly connected by the wire 44 to the wire 45 which leads through the outlet 47. Separate from the conductive coating 53 and 54 and contiguous to four sides of the valve element 36 at the fixed end is another conductive coating 56 electrically connected to the exposed edges of the center support member 49. The coating 56 is connected to the wire 46 which leads through the outlet 47 like the wire 45. It is important that the strips 51 and 52 be polarized in a manner such that, when a direct current voltage of a given polarity is applied across the wires 45 and 46, the free end of the value element 36 disposed between the nobbles 33 and 34 will deflect in one direction an amount proportional to the magnitude of the voltage. Reversing the polarity will also reverse the direction of the deflection.

Figure 6:
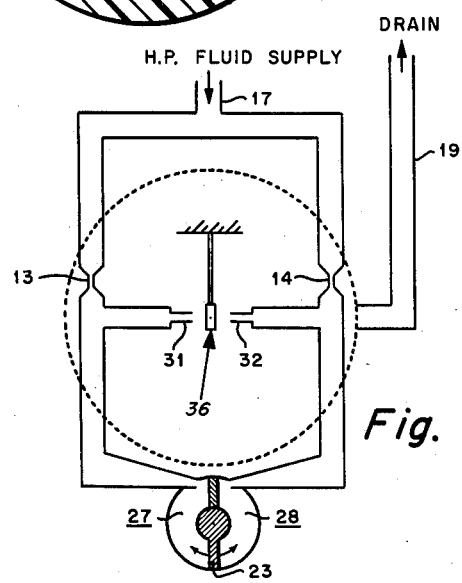
FIG. 6 is a schematic diagram of the fluid control circuit in the actuator.

The operation of the actuator will now be summarized with reference to the schematic diagram of FIG. 6. A high pressure fluid supply is delivered to the inlet orifices 13 and 14 through the fluid supply duct 17 in the gimbal 16 and then flows into the chambers 27 and 28. The aperture size of the inlet orifices 13 and 14 and bleed orifices 31 and 32 are proportioned in a manner whereby a null electrical input signal at wires 45 and 46 will position the valve element 36 midway between the nozzles 33 and 34 and maintain equal pressures in the chambers 27 and 28. Hence, the vane 23 is stationary. When a direct current voltage signal of a given polarity is applied to wires 45 and 46, the valve element 36 will deflect closer to one of the nozzles 33 and 34 and thereby change the pressures in the chambers 27 and 28 and cause the vane 23 to rotate in one direction. Reversing the polarity of the signal will cause the valve element 36 to deflect toward the other of the nozzles 33 and 34 and cause vane 23 to rotate in the other direction.

In a gimbal-stabilized magnetometer detecting element application of the actuator, the electrical signal represents the angular displacement of the detecting element from an oriented position with respect to the magnetic field of the earth. The position of the vane 23 and the shaft 21 attached thereto accordingly will correct the position of the gimbals supporting the detecting element.

It is contemplated that the actuator be constructed of substantially nonmagnetic materials such as aluminum and surfaces subject to sliding contact hardened and polished to very close tolerances so as to maintain a low coefficient of friction between the sliding parts thereby reducing the wear between these parts to a minimum. It is further noted that an actuator, constructed according to this disclosure, is capable of attaining good frequency response up to 100 cycles per second with a supply pressure of only 150 p.s.i. and a maximum flow of 22 cubic inches per minute. A torque of 18 ounce-inches is also attained.

It should be understood, of course, that the foregoing disclosure relates only to a preferred embodiment of the invention and that numerous modifications and variations may be made therein without departing from the spirit and scope of the invention as set forth in the appended claims.

What is claimed is:

1. A magnetically inert electromechanical actuator for a gimbal-stabilized magnetometer detecting head; comprising: a hollow cylinder closed at one end mounted on a fluid-conducting gimbal, a cylindrical fluid motor housing coaxial with said cylinder closing the other end of said cylinder, a shaft extending out of said motor housing, a vane fixed to the inner end of said shaft rotatable about the common axis of said cylinder and said motor housing and extending radially outward to the side of said motor housing, a separating wall fixed to the side of said housing and extending radially inward to the common axis thereby forming two expansible chambers in said motor housing, two inlet orifice means formed to directly communicate a high pressure fluid in said gimbal through the outer end of said motor housing respectively to each of said chambers, two bleed orifice means communicating through the inner end of said motor housing for conducting the fluid respectively from each of said chambers into said cylinder, two nozzle means respectively connected to said bleed orifice means for directing the fluid from said bleed orifice means toward each other, an outlet orifice means formed to directly communicate a low pressure drain in the said gimbal through the motor housing to within said cylinder; valve means for regulating the flow of the fluid from said chambers comprising: an electrically conductive cantilever support means secured to the enclosed end of said motor housing, the free end of said support means extending between said nozzle means, two polarized electrostrictive flat strips intimately secured respectively to the flat sides of said support means, first conductive coatings contiguous to the outer surface of each of said strips and extending over a length intermediate the ends of said strips, second conductive coatings contiguous to four sides of said valve means at the secured end and connected to the exposed edges of said support means, and conductor means adapted to connect a direct current electrical signal to said first and second coatings; whereby said shaft rotates with respect to said gimbal in response to a change in the signal applied to said conductor means, and wherein all of said actuator is constructed of substantially nonmagnetic materials.

2. A magnetically inert electromechanical actuator for a gimbal-stabilized magnetometer detecting head; comprising: an enclosed cylinder mounted on a fluid-conducting gimbal, an expansible chamber fluid motor fixed at the end of the cylinder adjacent said gimbal, an output shaft on said motor, inlet means formed to directly communicate a high pressure fluid in said gimbal to said motor, bleed means in said motor for conducting the fluid respectively from said motor into said cylinder, outlet means formed to directly communicate a low pressure drain in said gimbal to within said cylinder; valve means for regulating the flow of the fluid from said motor comprising: an electrically conductive cantilever means secured to said motor adjacent said cylinder, the free end of said cantilever means occluding said bleed means, polarized strip means intimately secured to said cantilever means, first conductor means contiguous to the outer surface of said strip means and extending over an outer portion of said strip means, second conductor means connected to said cantilever means, and third conductor means adapted to connect an electrical signal to said first and second conductor means; whereby said shaft rotates with respect to said gimbal in response to a change in the signal applied to said third conductor means, and wherein all of said actuator is constructed of substantially nonmagnetic materials.

3. A magnetically inert electromechanical actuator for a gimbal-stabilized magnetometer detecting head; comprising: a fluid motor mounted on a fluid-conducting gimbal, an output shaft in said motor, first means formed to directly communicate a fluid in said gimbal to said motor, second means in said motor for conducting the fluid from said motor, third means formed to directly return the fluid from said second means to said gimbal; cantilever-type valve means for regulating the flow of the fluid from said motor comprising: first cantilever conductor means secured to said motor, the free end of said first conductor means occluding said second means, polarized means secured to said first conductor means, second conductor means contiguous to the outer surface of said means, third conductor means connected to said first conductor means, and fourth conductor means adapted to connect an electrical signal to said second and third conductor means; whereby said output shaft rotates with respect to said gimbal in response to a change in the signal applied to said fourth conductor means, and wherein said actuator is constructed of substantially nonmagnetic materials.

4. An electromechanical device; comprising: an enclosed cylinder mounted on a fluid-conducting member, an expansible chamber motor fixed at the end of the cylinder adjacent said member, an output shaft on said motor, inlet means formed to directly communicate a high pressure fluid in said member to said motor, bleed means in said motor for conducting the fluid respectively from said motor into said cylinder, outlet means formed to directly communicate a low pressure drain in said member to within the cylinder; valve means for regulating the flow of the fluid from said motor comprising: an electrically conductive cantilever means secured to said motor adjacent to said cylinder, the free end of said cantilever means occluding said bleed means, polarized strip means intimately secured to said cantilever means, first conductor means contiguous to the outer surface of each of said strip means and extending over an outer portion of said strip means, second conductor means connected to said cantilever means, and third conductor means adapted to connect an electrical signal to said first and second conductor means; whereby said output shaft rotates with respect to said member in response to a change in the signal applied to said third conductor means.

References Cited in the file of this patent

UNITED STATES PATENTS

| | | |
|---|---|---|
| 2,443,333 | Tucker | June 15, 1948 |
| 2,447,825 | Tippen | Aug. 24, 1948 |
| 2,722,614 | Fryklund | Nov. 1, 1955 |
| 2,863,076 | Koren et al. | Dec. 2, 1958 |
| 2,928,409 | Johnson et al. | Mar. 15, 1960 |